Dec. 10, 1963   D. P. MICHEL ETAL   3,114,061
REFINER CONSTRUCTION
Filed April 20, 1961   2 Sheets-Sheet 1
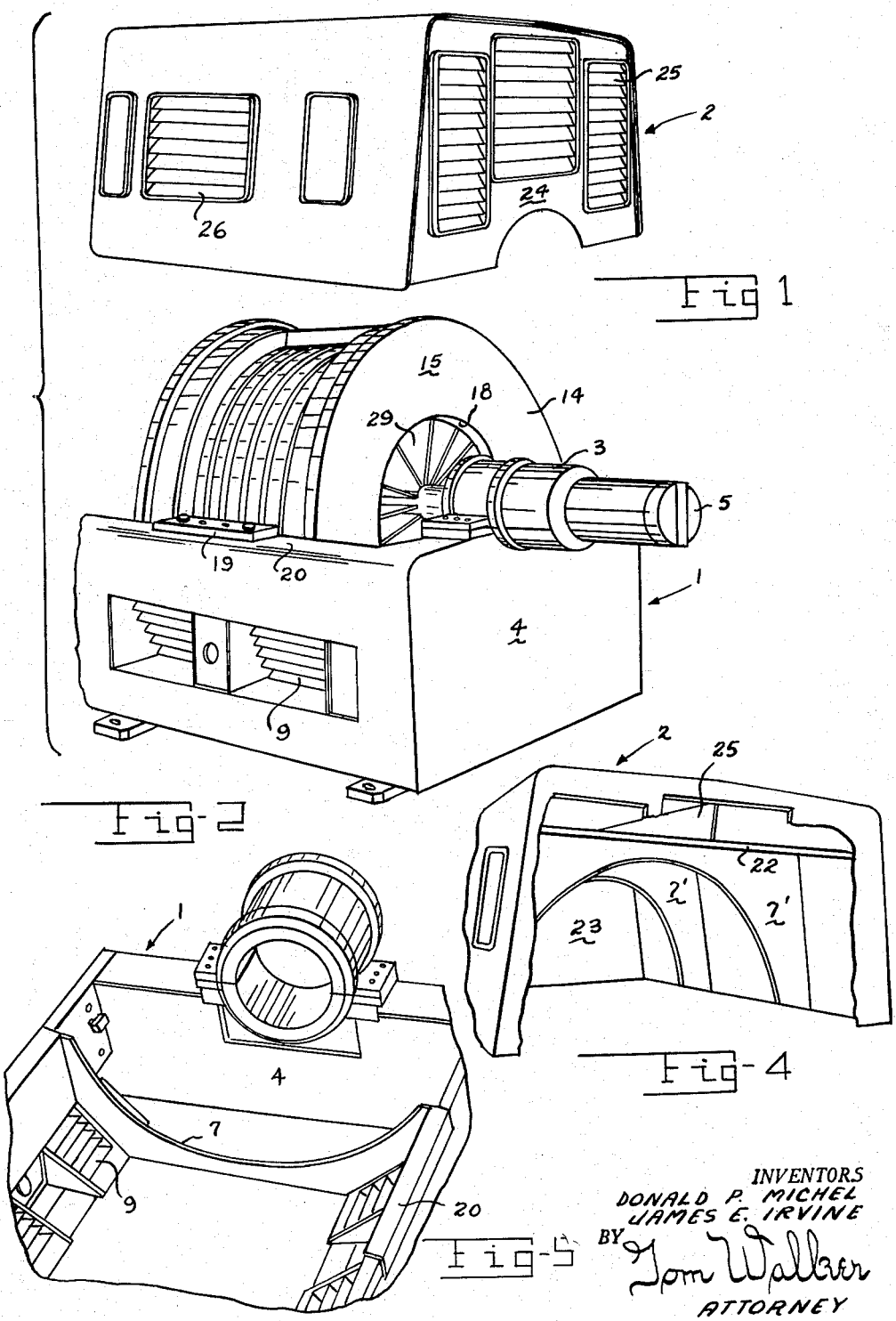
INVENTORS
DONALD P. MICHEL
JAMES E. IRVINE
BY Tom Walker
ATTORNEY

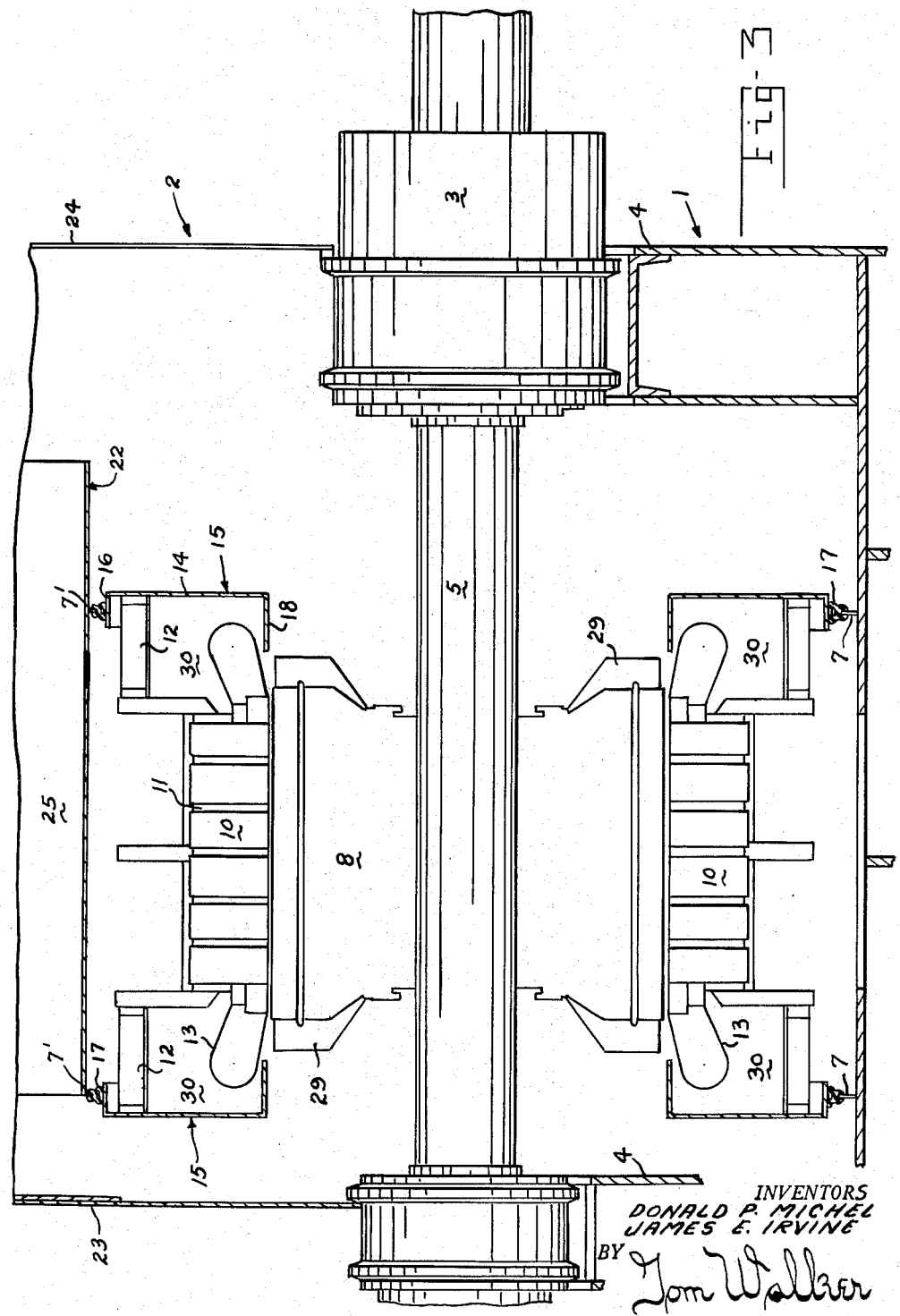

United States Patent Office 3,114,061
Patented Dec. 10, 1963

3,114,061
REFINER CONSTRUCTION
Donald P. Michel and James E. Irvine, Springfield, Ohio, assignors to The Bauer Bros. Co., Springfield, Ohio, a corporation of Ohio
Filed Apr. 20, 1961, Ser. No. 104,400
12 Claims. (Cl. 310—60)

This invention relates to refiner installations and more particularly to a novel housing and mount for a refiner motor unit.

Serious problems have existed for some time related to the means and methods employed for powering refiner units. To save space and preserve a degree of operating efficiency the drive unit in a refiner installation is generally included as an integrated part of the refiner per se and on a common base. In operation of such an installation, as conventionally provided, torque and vibration characteristics which are inherent in the system are reflected back and forth between the refiner elements and their motor or drive unit. This obviously tends to shorten the operating life and reduce the efficiency of both the motor unit and the refiner elements per se. A further problem exists due to the fact the nature of the refiner installation requires that the end of the motor unit adjacent the refiner equipment be substantially completely sealed to protect the motor. This makes it very difficult to ventilate the motor unit, causing it to overheat, often with deleterious effects. The latter may necessitate a shut down of a refiner installation, thereby increasing operational costs and reducing output.

The present invention provides apparatus alleviating the conditions above indicated. It provides an improved lightweight shell type housing enabling a simple mount of a refiner motor unit in a condition of static and dynamic balance. This substantially eliminates the problem of reflected vibration incident to operation of a motor unit in a conventional refiner installation. In addition, and even more significant, the shell is so formed to impart highly improved self-ventilating characteristics to the motor unit contained thereby.

A primary object of the invention is to provide improvements in housings for refiner motor units and the like rendering such housings economical to fabricate, more efficient and satisfactory in use, adaptable to a wide variety of applications and easy to install and maintain at maximum operating efficiency.

Another object of the invention is to provide a housing for refiner motor units and the like including features imparting improved self ventilating characteristics to the motor unit contained thereby.

A further object of the invention is to provide a housing enabling an improved simplified mount for a refiner motor unit or the like.

An additional object of the invention is to provide a simple improved shell type housing for a refiner motor unit.

Another object of the invention is to provide a novel drive installation for a refiner or the like.

A further object of the invention is to provide a motor mount and housing for refiners possessing the advantageous structural features, the inherent meritorious characteristics and the mode of operation herein mentioned.

With the above and other incidental objects in view as will more full appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a perspective view of the upper half of a shell constituting a motor housing in accordance with the invention;

FIG. 2 is a perspective view of the lower half of the shell, a refiner motor unit being shown as supported thereby in a condition of static and dynamic balance;

FIG. 3 is a vertical cross-sectional view of a refiner motor unit as housed within a shell as provided by the invention;

FIG. 4 is a fragmentary view of the shell portion illustrated in FIG. 1 with parts broken away for clarity of disclosure; and FIG. 5 is a fragmentary top perspective view of the lower half of the shell providing the motor housing in accordance with the invention.

Like parts are indicated by similar characters of reference throughout the several views.

The invention can be best described with particular reference to the accompanying drawings. The embodiment shown includes a shall type motor housing consisting of a base section 1 and a top or hood section 2. The sections 1 and 2, when superposed, provide a complete enclosure for a refiner motor unit M.

The base section 1 is in the nature of a rectangular receptacle which is open at the top. It mounts axially aligned bearings 3 on its respective end plates 4 accommodating the drive shaft 5 of the motor unit M. Parallel plate sections 7 nest within the receptacle 1, respectively adjacent and parallel to its end plates 4. The central portions of the upper edges of the plates 7 are provided with identically formed arcuate recesses the purposes of which shall soon become obvious. In addition, the front and back sides of the receptacle 1 are provided with spaced openings intermediately of the plates 7. Louvered sections 9 are fixed in these spaced openings to provide for controlled discharge of air from adjacent the motor M in a manner to be further described.

The motor M includes a stator 10 formed with slots 11 spaced circumferentially thereabout and longitudinally thereof. The opposite ends of the stator are respectively provided with cylindrical projections 12 forming shields about projected coils 13. Annular members 14 are fixed perpendicular to the projected extremities of the respective projections 12 and together therewith form end bells 15.

The members 14 each include a ring portion projected radially inward and outward of the cylinders 12 having concentric cylindrical flanges 18 and 16 respectively at their inner and outermost peripheries. The flanges 16 project toward each other in overlying spaced relation to the cylindrical projections 12 while the flanges 18 project toward each other substantially in alignment with the innermost surface of the stator 10. The flanges 16 nest to their lower halves in the arcuate recesses provided in plates 7 with seals 17 interposed therebetween. It should be noted that the flanges 18 terminate short of the respective ends of the stator 10 at positions to only partially enclose the coils 13 and thereby provide access for air to enter the chambers 30 defined by the end bells 15. Suitable openings are provided between chambers 30 and stator 10 to permit movement of air from the chambers to the outer surface of the stator.

Connected to and fixed between the flanges 16 are stator mounting plates 19. The plates 19 are oriented to project outwardly from the stator 10 in a common diametral plane. The front and back sides of the receptacle 1 have mounting pads 20 fixed on their upper edges intermediate the plates 7. Stator 10 is statically and dynamically balanced by means of the plates 19 being positioned in fixed relation on the pads 20 whereby the stator is nested in receptacle 1 between the plates 7. As mentioned previously the end bells 15 are simultaneously accommodated in the plates 7 to either end of the stator.

The motor M includes a rotor 8 which is conventionally fixed to the drive shaft 5 and oriented within and in concentric spaced relation to the stator 10. The rotor 8 has radially oriented fan blades 29 projected from its respective extremities. Blades 29 function to create an air flow within the motor housing in a manner to be described.

As mentioned previously, the shell section 2 completes an enclosure for the motor M when superposed to have its dependent extremities seat on and mate with the upper edges of the receptacle 1. A duct 22 is fixed to depend from the inner surface of the top plate 21 of section 2. The duct 22 extends from the front to the back side of the section 2 and has open ends which terminate short of its end plates 23 and 24. A central divider plate 25 positioned longitudinally of the duct defines equal through passages to either side thereof. Fixed to depend in parallel relation from the bottom of the duct and to orient coplanar with plates 7 in receptacle 1 are spaced plates 7'. The plates 7' have arcuately formed recesses in their dependent edges adapted to nest the upper halves of cylindrical flanges 16 of the motor end bells 15 and the seals 17 thereabout. The plates 7 and 7' seals 17 and end bells 15 thereby define a chamber peripherally of stator 10, the lateral extremities of which are sealed.

The plates 4 and 23 to one end of the enclosure provided by the shell sections 1 and 2 are imperforate. However, the end plate 24 of the upper shell section 2 is provided with three vertically oriented openings in side by side relation. These openings are filled by louvered sections 25. The sections 25 provide controlled inlets for introduction of air to the enclosure provided by the sections 1 and 2. In addition the front and back sides of the section 2 have further openings intermediate plates 7' and under duct 22 which are filled by louvered sections 26. The latter enables a controlled discharge of air from within the hood section 2. A point of particular significance is that the area of the opening to the duct 22 at its end adjacent the openings provided by the louvered sections 25 is approximately equal to the area of the opening to the end of the rotor 8 through the adjacent end bell 15.

It will be seen that any air drawn through sections 25 must seek passage either through duct 22 or the opening to rotor 8 defined by the flange 18 of the adjacent end bell 15.

The complete structure above described accomplishes the objectives of the invention in the following manner. As noted previously, the imperforate end of the motor enclosure including plates 4 and 23 is to be positioned adjacent the refiner equipment with which the motor M is associated. The only air inlets to the enclosure are provided by the louvered sections 25 to its opposite end. Operation of the motor provides a drive of the shaft 5 and rotor 8. As this occurs the fan blades 29 function to draw air within the enclosure through the sections 25. Since the relative areas defined by the adjacent end of the duct 22 and the inner periphery of the adjacent end bell 15 are approximately equal, the air drawn within the motor enclosure will inherently flow in substantially equal proportion through the duct 22 and to the adjacent end of the rotor 8. The portion of the air traveling through the duct 22 will be directed to the imperforate wall of the motor enclosure remote from the inlets 25 to be deflected to the opposite end of the rotor 8. The end bells 15 together with seals 17 and plates 7 and 7' prevent any of this inlet air being directly admitted between the stator assembly and the external wall of the motor enclosure.

Due to this inherent division of air as it is drawn into the motor enclosure substantially equal amounts of air will be drawn into the chambers defined by end bells 15 through the openings adjacent the respective ends of the rotor and stator provided by the termination of the end bell flanges 18 short of the stator. Air will also move inwardly over rotor 8 from either end thereof. The air drawn into the end bells 15 will circulate about the coils 13 and move to the outer surface of the stator through adjacent slots. The spinning rotor will create centrifugal force effects to pass air moving over its periphery against and through slots in the stator to the chamber defined thereabout between the sealed baffle plates 7 and 7'. As air is continuously forced or drawn through the louvered plates 25, it produces a constant pressured flow of air moving substantially equally over the rotor and stator from opposite ends. Air which is heated in passage to the periphery of the stator is discharged to the top and bottom sides of the motor enclosure, respectively through sections 26 and 9. There is thus provided a free and continuous movement of air in controlled paths enabled by the construction of the motor enclosure and the particular orientation of the motor unit with respect thereto. The provision for discharge through the sides of both the top and bottom sections of the enclosure intermediate the plates 7 and 7' avoids the creation of stagnant areas.

In particular, the passage afforded for air drawn through the inlets 25 insures controlled circulation to a degree enabling the efficient and effective control of motor temperature during its operation. The circulation as provided avoids any trapping of air such as would lead to damage to the motor, irrespective of the loads to which it may be normally subjected.

As noted previously, the support of stator 10 by means of plates 19 to relatively isolate it from its base insures a static and dynamic balance of the motor in operation. The fact that the motor is perfectly balanced on the upper edges of the sides of receptacle 1 removes the possibility of unbalance or vibrations incident to operation of connected refiner equipment being passed to and reflected from the stator. This avoids transmission of factors which inherently tend to unbalance refiner systems and reduce the operating life and efficiency of both the refiner equipment and its drive motor.

It will be noted that this invention is defined with respect to refiner equipment since its novelty is particularly related thereto. However, it is not intended thereby to discount the advantages of the invention application to similar equipment confronted with similar problems. The invention definitely affords a means for efficiently maintaining an optimum operating temperature for a motor unit through a wide range of load operation under unfavorable operating conditions.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described our invention, we claim:

1. A refiner motor installation including, means defining a receptacle having relatively elevated end and side margins and including bearing portions on respective end margins, a drive shaft extending through and bearing in said bearing portions, a rotor fixed for rotation with said drive shaft, and a stator mounted concentric with said rotor, in spaced relation thereabout, having mounting elements horizontally projected in a diametral plane thereof to respectively rest on opposite side margins of said receptacle whereby to suspend said stator in a condition of static and dynamic balance.

2. A refiner motor installation comprising a base, means outlining a receptacle, including spaced end wall sections and relatively spaced front and back wall sections rectangularly oriented and vertically projected from said base, means defining a stator including generally cylindrical end bells to its respective extremities, means extending between said front and back walls in parallel spaced relation to nest said end bells, said stator means having co-planar horizontally projected plates mounted on the upper edges of said front and back walls to position said stator means in a condition of static and dynamic balance and means defining a rotor including a projected drive shaft bearing on said end walls to nest said rotor concentrically within said stator means.

3. A motor installation consisting of means defining a base support including rectangularly oriented vertical plates, a drive shaft, a rotor fixed for rotation with said drive shaft, a portion of said plates providing a bearing support for said drive shaft, a stator, said stator having diametrically opposite projected plates which are co-planar, another portion of said vertical plates mounting said diametrically projected plates to support said stator in static and dynamic balance and in concentric spaced relation to said rotor, end bells on said stator, another portion of said plates nesting said end bells and seals provided therebetween whereby to isolate said stator from vibrations transmitted through said base support.

4. A motor installation including means defining an enclosure, a shaft, bearings for said shaft provided in opposite ends of said enclosure, a rotor fixed within said enclosure for rotation with said shaft, a stator positioned concentrically about said rotor having means mounting it to sides of said enclosure in a condition of static and dynamic balance, one end of said enclosure being imperforate and the opposite end of said enclosure having means defining an inlet for controlled admission of air, duct means fixed in said enclosure having one end open adjacent said imperforate wall, end bells on said stator, means in said enclosure providing spaced seals about said end bells to either end of said rotor and stator, said end bells to either end of said stator being formed for admission of air internally thereof, said stator including openings providing access therethrough and from said end bells, means defining discharge outlets to opposite sides of said enclosure and fan blades on opposite ends of said rotor operative to draw air into said enclosure to pass a portion thereof through said inlet to said rotor and into the end bell to one end of said stator, said duct means delivering air to the other end of said stator and rotor for similar movement to provide a continuous circulation and discharge of air as long as said rotor rotates whereby to maintain the motor installation at an optimum operating temperature.

5. In combination a rotor, a stator concentric therewith, means defining an enclosure about and in spaced relation to said stator and rotor, means defining a duct in said enclosure communicating with opposite ends of said stator and rotor, means in said enclosure providing spaced seals about said stator to opposite ends thereof to prevent direct passage of air from one end of said stator to the other adjacent its outer periphery, means for introducing air into said enclosure, said duct means being arranged to provide that approximately one-half the air delivered will be transmitted to each of the opposite ends of said rotor and stator, means defining passages to and through said stator and outlets from said enclosure intermediate said seals whereby to effect a controlled continuous circulating flow of air within said enclosure to maintain said rotor and stator at optimum operating temperatures.

6. A motor installation particularly applicable to a refiner unit comprising means defining an enclosure including opposite end walls one of which is imperforate and the other perforate and further including opposite side walls, a motor unit within said enclosure consisting of a rotor and stator including means horizontally projected to support said stator on opposite side walls of said enclosure means and means formed within said enclosure to provide for delivery of air simultaneously to opposite ends of said motor unit for continuous movement through said stator and discharge from said enclosure thereabout whereby to maintain said motor unit at optimum operating temperature.

7. A motor installation particularly applicable to a refiner unit comprising, a stator, a rotor, a drive shaft fixed to the rotor, means defining an enclosure about said rotor and stator having means bearingly supporting said drive shaft, said enclosure means including opposite end walls one of which is imperforate and the other perforate, means mounting said stator to said enclosure means to position it in concentric relation to said rotor, means cooperatively related between the respective ends of said stator and the enclosure means thereabout preventing direct passage of air from said perforate end wall across the outer periphery of said stator, said enlcosure means having outlets adjacent the outer periphery of said stator and means formed within said enclosure providing for a delivery of air passing through said perforate end wall substantially simultaneously to opposite ends of said stator and rotor, said stator having means defining slots therein for passage of air therethrough whereby to provide for a continuous moving flow of air passing over said rotor and stator and through said outlets.

8. A motor installation particularly applicable to refiner units comprising, means defining an enclosure, a motor unit housed therein, at least one wall of said enclosure being perforate to provide for admission of air within said enclosure and the opposite wall imperforate, means in said enclosure for channelling selective portions of air admitted to opposite ends of said motor unit and means defining openings through said motor unit for commonly passing the air delivered to opposite ends thereof to and over its outer periphery and means defined in said enclosure for channelling air from the periphery of said motor unit.

9. A motor unit particularly applicable to refiner installations comprising, means defining an enclosure, a motor unit including a rotor and stator concentrically positioned in said enclosure, means defining a walled chamber peripherally of said stator within said enclosure including imperforate end walls, duct means bridging said end walls to open adjacent the opposite ends of said rotor and stator, means defining an air inlet to said enclosure adjacent one end of said duct means, means for introducing air within said enclosure in response to operation of said rotor, said duct means being formed to provide that a selected proportion of air admitted will pass to the respective ends of said rotor and means provided for movement of the air received by said rotor to and about said stator into said walled chamber and means defining outlets from said walled chamber whereby to enable a continuous pressured movement of air over and about said rotor and stator as said rotor operates.

10. A motor installation particularly applicable to a refiner unit comprising, means defining an enclosure including opposite end walls one of which is imperforate and the other perforate, a motor unit supported by said enclosure means consisting of a rotor and stator in concentric relation, and means for simultaneously introducing air into said enclosure to opposite sides of said motor unit, said stator having slots defined therein whereby the air will pass from said rotor through said stator and means defining discharge openings from said enclosure peripherally of said stator.

11. A motor unit, including a base section defining a receptacle and raised margins, a rotor received in said receptacle and having a bearing on said margins, a stator in surrounding relation to said rotor and suspended from said margins at points angularly spaced from the bearings of said rotor thereon, an overlying section superposed on said base section to define an enclosure, means on said sections cooperating with said stator to define an annular chamber around said stator, and openings in said enclosure for air flow through said chamber.

12. A motor unit according to claim 11, characterized by a duct in said overlying section conducting air to opposite ends of said rotor, said duct forming a part of said means defining an annular chamber around said stator.

References Cited in the file of this patent
UNITED STATES PATENTS

| | | |
|---|---|---|
| 773,550 | Dihlmann | Nov. 1, 1904 |
| 2,886,721 | Picozzi et al. | May 12, 1959 |